United States Patent
Luk et al.

(10) Patent No.: US 11,556,861 B2
(45) Date of Patent: Jan. 17, 2023

(54) DEBUGGING CORRECTNESS ISSUES IN TRAINING MACHINE LEARNING MODELS

(71) Applicant: Google LLC, Mountain View, CA (US)

(72) Inventors: Chi Keung Luk, Fremont, CA (US); Jose Americo Baiocchi Paredes, Mountain View, CA (US); Russell Power, Seattle, WA (US); Mehmet Deveci, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 926 days.

(21) Appl. No.: 16/403,884

(22) Filed: May 6, 2019

(65) Prior Publication Data

US 2020/0356905 A1 Nov. 12, 2020

(51) Int. Cl.
*G06N 20/20* (2019.01)
*G06N 3/08* (2006.01)
*G06N 3/04* (2006.01)

(52) U.S. Cl.
CPC ............... *G06N 20/20* (2019.01); *G06N 3/08* (2013.01)

(58) Field of Classification Search
CPC ......... G06N 20/20; G06N 3/08; G06N 3/0454
See application file for complete search history.

(56) References Cited

U.S. PATENT DOCUMENTS

| | | | | |
|---|---|---|---|---|
| 2019/0286541 A1* | 9/2019 | Sobala | ................. | G06K 9/6267 |
| 2019/0340492 A1* | 11/2019 | Burger | .................... | G06N 3/08 |

OTHER PUBLICATIONS

Eclipse.com [online], "Parallel Debugging", [retrieved on May 17, 2019], retrieved from: URL <http://help.eclipse.org/oxygen/index.jsp?topic=%2Forg.eclipse.ptp.doc.user%2Fhtml%2F06parDebugging.html>, 11 pages.
Yu et al. "Curvature-based Comparison of Two Neural Networks" arXiv, Jan. 2018, 7 pages.

* cited by examiner

*Primary Examiner* — Shirley X Zhang
(74) *Attorney, Agent, or Firm* — Honigman LLP; Brett A. Krueger (57) ABSTRACT

Methods, systems, and apparatus, including computer programs encoded on a computer storage medium, for debugging correctness issues in training machine learning models. In one aspect, a method comprises training a first machine learning model using a first computing system having a first configuration; training a second machine learning model using a second computing system having a second configuration, wherein the second configuration of the second computing system is different than the first configuration of the first computing system; and determining, for each of a plurality of shared training operations that are performed by both the first computing system and the second computing system, a respective similarity measure that measures a similarity between: a first training output generated by the first computing system by performing the shared training operation, and a second training output generated by the second computing system by performing the shared training operation.

18 Claims, 4 Drawing Sheets

FIG. 1

```
****** Diff between following tensor traces ******
  Trace-0: ['tensor_inspector_test-norm-trace.txt']
  Trace-1: ['tensor_inspector_test-norm-cpu-trace.txt']

Steps exist only in trace-0: []
Steps exist only in trace-1: [1, 2]
Steps common to both traces: [0]

**** Per-step diff for the common steps ****

*** Diff in step 0 ***
** Step 0: Tensors exist only in trace-0:
  CrossReplicaSum/group_assignment:0
  CrossReplicaSum:0
...
** Step 0: Tensors exist only in trace-1:
  IteratorGetNext:0
  IteratorGetNext:1
...
** Step 0: Diff for tensors that exist in both traces:
  (tensors printed in topological order of ops in trace-0)
  conv2d_1/dilation_rate:0 [avg:65%, max:65%]
  conv2d/dilation_rate:0 [avg:65%, max:65%]
  gradients/sequential/dropout/dropout/div_grad/Shape_1:0 [identical]
  gradients/sequential/dropout/dropout/div_grad/Shape:0 [avg:30%, max:30%]
  gradients/sequential/conv2d_1/Relu_grad/ReluGrad:0 [avg:3%, max:3%]
```

DEBUGGING CORRECTNESS ISSUES IN TRAINING MACHINE LEARNING MODELS

BACKGROUND

This specification relates to debugging correctness issues that occur during machine learning model training.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

A variety of correctness issues can occur during machine learning model training, e.g., operations performed during the training may result in the generation of not-a-number (NaN) values, or the model parameters of the machine learning model may fail to converge. More generally, a correctness issue occurs during training when the execution of the training fails or is otherwise not deemed to be acceptable for a particular context.

SUMMARY

This specification describes a debugging system implemented as computer programs on one or more computers in one or more locations.

According to a first aspect there is provided a method that includes training a first machine learning model having a machine learning model architecture using a first computing system having a first configuration. A second machine learning model having the machine learning model architecture is trained using a second computing system having a second configuration. The second configuration of the second computing system is different than the first configuration of the first computing system.

For each of multiple shared training operations that are performed by both the first computing system and the second computing system, a respective similarity measure is determined that measures a similarity between: a first training output generated by the first computing system by performing the shared training operation during the training of the first machine learning model, and a second training output generated by the second computing system by performing the shared training operation during the training of the second machine learning model.

The respective similarity measure determined for each of the multiple shared training operations are provided for use in comparing: (i) the training of the first machine learning model performed by the first computing system having the first configuration, and (ii) the training of the second machine learning model performed by the second computing system having the second configuration.

In some implementations, the first training outputs generated by the first computing system are generated using one or more application-specific integrated circuits; and the second training outputs generated by the second computing system are generated using one or more central processing units.

In some implementations, the application-specific integrated circuits are artificial intelligence accelerators.

In some implementations, one or more of the artificial intelligence accelerator application-specific integrated circuits are tensor processing units.

In some implementations, the first training outputs generated by the first computing system are generated using one or more first application-specific integrated circuits having an X-bit architecture; and the second training outputs generated by the second computing system are generated using one or more second application-specific integrated circuits having a Y-bit architecture, wherein X and Y are different positive integer values.

In some implementations, one or more correctness issues occur during the training of the first machine learning model, and no correctness issues occur during the training of the second machine learning model.

In some implementations, parameter values of the first machine learning model do not converge during the training using the first computing system; and parameter values of the second machine learning model converge during the training using the second computing system.

In some implementations, one or more special values are generated during the training using the first computing system; and no special values are generated during the training using the second computing system.

In some implementations, the special values are not-a-number values.

In some implementations, the machine learning model architecture is a neural network architecture.

In some implementations, the shared training operations include one or more of: determining a value of an objective function, determining a gradient of the objective function, determining an output of a neural network layer, determining a result of a convolution operation of a neural network layer, determining a result of an activation function of a neural network layer.

In some implementations, the first training output includes a first matrix and the second training output include a second matrix.

In some implementations, determining a respective similarity measure between the first training output and the second training output includes determining a first signature that represents the first matrix, where the first signature has a lower dimensionality than the first matrix; determining a second signature that represents the second matrix, where the second signature has a lower dimensionality than the second matrix; and determining whether the first signature and the second signature are the same.

In some implementations, a signature representing a tensor (or matrix) includes one or more of: data indicating whether any elements of the tensor have special values, a matrix norm of the tensor, or a proper subset of the tensor.

In some implementations, training the first machine learning model includes: using a random number generator to generate random values; and using the random values during the training of the first machine learning model. Training the second machine learning model includes: obtaining the random values used during the training of the first machine learning model; and using the random values during the training of the second machine learning model.

In some implementations, the shared training operations each occur during a particular training iteration; and the particular training iteration is identified by performing a binary search for a first training iteration where a particular similarity measure between a particular first training output generated at the particular training iteration and a particular second training output generated at the particular training iteration does not meet a predetermined threshold.

In some implementations, providing the respective similarity measure determined for each of the plurality of shared training operations includes generating a graphical representation of the respective similarity measures that presents the respective similarity measures in accordance with a topological ordering of a graph of training operations performed by the first and second computing systems. The graphical representation is stored or presented to a user.

According to a second aspect there are provided one or more non-transitory computer storage media storing instructions that when executed by one or more computers cause the one or more computers to perform operations including the operations of the first aspect.

According to a third aspect, there is provided a system including one or more computers; and one or more storage devices communicatively coupled to the one or more computers. The one or more storage devices store instructions that, when executed by the one or more computers, cause the one or more computers to perform operations including the operations of the first aspect.

Particular embodiments of the subject matter described in this specification can be implemented so as to realize one or more of the following advantages.

The debugging system described in this specification may enable users to identify and resolve correctness issues that occur during the training of a machine learning model more quickly than would otherwise be possible.

For example, users can encounter a variety of correctness issues when training machine learning models using artificial intelligence (AI) accelerator application-specific integrated circuits (ASICs). The debugging system described in this specification can compare the execution of a machine learning model training procedure on an AI accelerator ASIC and on a central processing unit (CPU) and provide data describing the comparison to a user for evaluation.

The comparison can be done at different granularities. For example, the comparison can be done at the "iteration level", e.g., by comparing respective objective function values generated by the ASIC and the CPU at respective training iterations. As another example, the comparison can be done at the "operation level", e.g., by comparing the results of neural network convolutions performed by the ASIC and the CPU at respective training iterations.

By examining data generated by comparing the execution of the machine learning model training procedure on the ASIC and on the CPU at a particular granularity, the user can gain insight more quickly into, e.g., why the training may converge on the CPU but not on the ASIC.

These are improvements in the field of software development and machine learning.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technology that facilitates "debugging" (i.e., identifying and resolving) correctness issues that can occur during machine learning model training. Again, a correctness issue occurs during training when the execution of the training fails or is otherwise not deemed to be acceptable for a particular context.

A variety of correctness issues can occur. For example, operations performed during training may result in the generation of numeric data with "special values" (e.g., not-a-number (NaN) values), e.g., due to division-by-zero errors. As another example, the model parameters of the machine learning model may fail to converge during training. That is, rather than stabilizing over the course of many training iterations, the values of some or all of the model parameters may oscillate or grow without bound.

The occurrence of some correctness issues during machine learning model training may depend on the "configuration" of the computing system being used to perform the training. For example, certain correctness issues may occur during training of a machine learning model on an AI accelerator ASIC that do not occur during training of the same machine learning model on a CPU. As another example, certain correctness issues may occur during training of a machine learning model on an AI accelerator ASIC having an X-bit architecture (e.g., 32-bit or 64-bit) which do not arise during training of the same machine learning model on an AI accelerator ASIC having a different, Y-bit architecture.

The debugging system described in this specification can facilitate debugging of correctness issues occurring during machine learning model training that depend on the configuration of the computing system being used to perform the training. For example, the debugging system can generate "debugging data" that tracks the similarity between corresponding training outputs generated by: (i) a first computing system that successfully trains a machine learning model, and (ii) a second computing system (having a different configuration) where correctness issues occur during training of the same machine learning model.

A user of the debugging system can use this debugging data to identify particular training operations that were performed by both computing systems and that resulted in the generation of different training outputs. The identification of these particular training operations may enable the user to debug the correctness issues that occurred during training of the machine learning model on the second computing system more quickly than would otherwise be possible.

The debugging system described in this specification can be used in any of a variety of different settings. For example, the debugging system may be part of a cloud computing system that enables users to use cloud computing resources to train machine learning models. In a particular example, the cloud computing system may enable users to use AI accelerator ASICs to train machine learning models, and the debugging system can facilitate debugging of correctness issues that occur during training of machine learning models using the AI accelerator ASICs.

These features and other features are described in more detail below.

Figure 1:
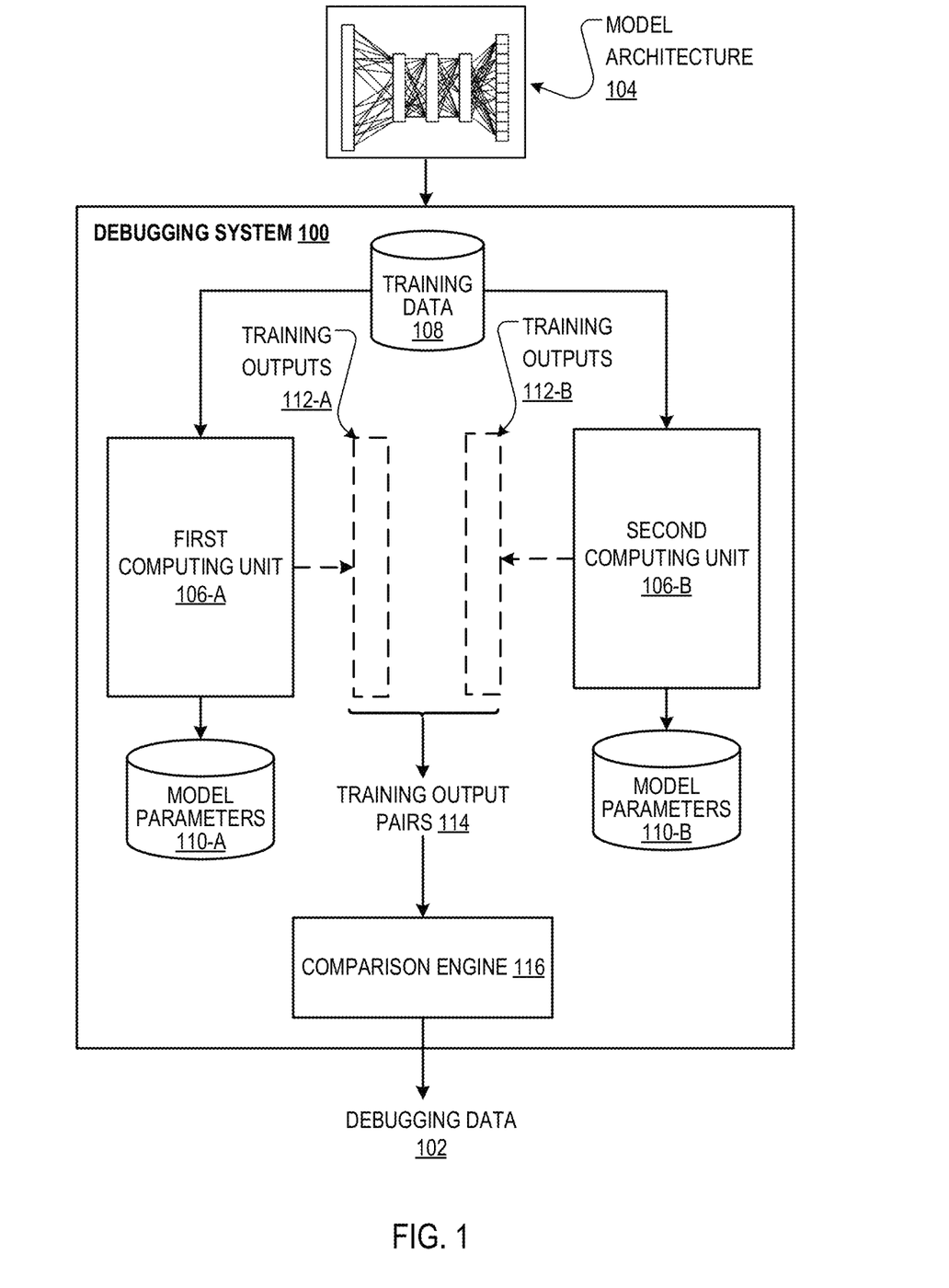
FIG. 1 shows an example debugging system.

FIG. 1 shows an example debugging system 100. The debugging system 100 is an example of a system implemented as computer programs on one or more computers in one or more locations in which the systems, components, and techniques described below are implemented.

The system 100 is configured to generate debugging data 102 that compares the training of machine learning models having a common machine learning model architecture 104 on: (i) a first computing system 106-A, and (ii) a second computing system 106-B. As will be described in more detail below, the debugging data 102 can enable a user of the system 100 to more effectively debug correctness issues that occur during the model training on one or both of the computing systems.

A "computing system" (e.g., the first computing system 106-A or the second computing system 106-B) may include one or more central processing units (CPUs), graphical processing units (GPUs), application-specific integrated circuits (ASICs), field-programmable gate arrays (FPGAs), or any other appropriate computing units.

An ASIC may be referred to as an artificial intelligence (AI) accelerator ASIC if it is designed (or otherwise particularly applicable) to hardware acceleration of machine learning operations, e.g., machine learning model training. A tensor processing unit (TPU) is one example of an AI accelerator ASIC.

The first computing system 106-A is said to be "configured" differently than the second computing system 106-B. The configuration of a computing system can refer to any aspect of the hardware or software implementing the computing system. A few examples follow.

In one example, the hardware of the first computing system 106-A may be implemented as a CPU and the hardware of the second computing system may be implemented as an AI accelerator ASIC.

In another example, the hardware of the first computing system may be implemented as an AI accelerator ASIC with an X-bit architecture and the hardware of the second computing system may be implemented as an AI accelerator ASIC with a different, Y-bit architecture.

In another example, the software of the first computing system may use a different computer code compiler than the software of the second computing system.

In another example, the software of the first computing system may use a different floating point precision when performing calculations than the software of the second computing system.

The system 100 can receive data defining the model architecture 104, and training data 108 for training machine learning models having the model architecture 104, in any of a variety of ways. For example, the system 100 can receive the data defining the model architecture 104 and the training data 108 as an upload from a remote user of the system 100 over a data communication network, e.g., using an application programming interface (API) made available by the system 100.

The architecture of a machine learning model refers to data defining the "type" and "structure" of the machine learning model.

The type of a machine learning model broadly classifies the form of the machine learning model. For example, possible types of machine learning models include: neural network models, random forest models, support vector machine models, and linear regression models.

The structure of a machine learning model defines the arrangement and operation of the parts of the machine learning model. For example, the structure of a neural network model refers to: the number of layers of the neural network, the operations performed by each of the layers (e.g., including the type of each of the layers), and the connectivity between the layers (i.e., which layers receive inputs from which other layers). Examples of possible types of neural network layers include, for example: fully-connected layers, convolutional layers, recurrent layers, and batch-normalization layers. As another example, the structure of a random forest model can refer to one or more of: a maximum (or predetermined) number of decision trees in the random forest, the maximum depth of each decision tree, the type of splitting function used at each node of the decision tree, and the number of features used to determine the parameter values of the splitting function used at each node.

For convenience, the system 100 is described with reference to the model architecture 104 being a neural network model architecture. However, other model architectures are possible.

The training data 108 can be any sort of data that can be used to train a machine learning model having the model architecture 104. For example, the training data 108 can include multiple training examples, where each training example includes a training input, and optionally, a target output that should be generated by a machine learning model by processing the training input. In a particular example, a training input may be an image, and a target output corresponding to the training input may define a category of object depicted in the image.

To generate the debugging data 102, the system 100 trains a first machine learning model having the model architecture 104 on the training data 108 using the first computing system 106-A, and trains a second machine learning model having the model architecture 104 on the training data 108 using the second computing system 106-B. That is, the system 100 uses the first computing system 106-A to determine trained values of the model parameters 110-A of the first machine learning model and the second computing system 106-B to determine trained values of the model parameters 110-B of the second machine learning model.

A computing system (e.g., the first computing system 106-A or the second computing system 106-B) can train a machine learning model on the set of training data 108 using any appropriate machine learning training technique. For example, the computing system may train the machine learning model on the training data 108 over multiple training iterations using a stochastic gradient descent training technique. In this example, at each training iteration, the computing system may select a batch (i.e., set) of one or more training examples, and process the training inputs of the training examples in accordance with the current values of the model parameters of the machine learning model to generate corresponding outputs. The computing system can thereafter update the current values of the model parameters of the machine learning model using gradients of an objective function with respect to the model parameters. The objective function depends on the outputs generated by the machine learning model for the current batch of training examples, and optionally, the target outputs of the current batch of training examples. For example, the objective function may be a cross-entropy loss objective function, a squared-error objective function, or a triplet loss objective function.

During the training of the machine learning models, the first computing system 106-A and the second computing system 106-B each perform respective training operations that result in the generation of respective training outputs 112-A and 112-B.

The system 100 generates the debugging data 102 by comparing respective training outputs generated by the first computing system 106-A and the second computing system 106-B. The system 100 can compare training outputs at multiple levels of granularity. For example, the system 100 can compare the values of the objective function, updated model parameters, or objective function gradients generated by the respective computing systems at respective training iterations. At a finer level of granularity, the system 100 can compare the values of the outputs of particular neural network layers or the results of certain operations performed within neural network layers (e.g., convolutional operations or activation function operations) by the respective computing systems at respective training iterations. At a yet finer level of granularity, the system 100 can compare the tensor values generated by basic operations (e.g., additions) performed by the respective computing systems at respective training iterations.

The training outputs generated by the first and second computing systems can be represented as numerical values, or as ordered collections of numerical values, e.g., vectors, matrices, or tensors of numerical values.

A training output pair 114 refers to: (i) a first training output generated by the first computing system 106-A, and (ii) a corresponding second training output generated by the second computing system 106-B, where the first and second training outputs are directly comparable. The first and second training outputs are said to be directly comparable if they are each generated as a result of a shared training operation that is performed by both the first and second computing systems at the same training iteration.

Depending on the respective configurations of the first computing system 106-A and the second computing system 106-B, some of their training outputs may not be directly comparable. For example, a CPU and an AI accelerator ASIC may perform different basic operations during model training, and therefore the training outputs generated by those respective basic operations may not be directly comparable.

To generate the debugging data 102, the system 100 identifies one or more training output pairs 114 from the respective training outputs generated by the first and second computing systems, and provides the training output pairs to the comparison engine 116.

The comparison engine 116 is configured to process each training output pair 114 to determine a respective similarity measure between the first training output and the second training output included in the training output pair 114.

The comparison engine 116 can determine the similarity measure between the corresponding training outputs in a training output pair 114 in any of a variety of ways. A few examples follow.

In one example, the comparison engine 116 can determine the similarity measure between the corresponding training outputs in the training output pair 114 by directly computing a numerical similarity measure between them. For example, for training outputs represented as respective numerical values, the comparison engine 116 may determine the similarity measure between as a percentage difference in their respective values. As another example, for training outputs represented as respective matrices of numerical values, the comparison engine 116 may determine the similarity measure between them as a matrix norm of a difference between the respective matrices. The matrix norm may be, e.g., a Frobenius norm or a norm that outputs the maximum of the absolute values of the components of a matrix.

In another example, the comparison engine 116 can determine the similarity measure between the corresponding training outputs in the training output pair 114 by mapping each of the training outputs to a respective "signature", and then determining a similarity measure between the respective signatures. Generally, a signature of a training output refers to a lower-dimensionality representation of the training output. The comparison engine 116 may map a training output to a corresponding signature given by, e.g., a binary variable that has value "1" only if one or more of the components of the training output have a special value (e.g., a value of not-a-number (NaN)), a matrix norm of the training output, or a proper subset of the components of the training output. After mapping the training outputs to respective signatures, the comparison engine 116 can determine the similarity measure between the respective signatures in any of a variety of ways, e.g., as a percentage difference in their respective values or as a matrix norm of their difference.

A difference between corresponding training outputs in a training output pair 114 can result from any of a variety of causes. In particular, the potential causes include: (i) a correctness issue on the first or second computing system related to the shared training operation that generated the training outputs, or (ii) non-determinism (i.e., randomness) in the training operations performed by the first and second computing systems.

Non-determinism in the training operations performed by a computing system during training of a machine learning model may result from randomness in, e.g., how batches of training data are selected at each training iteration, the order in which training examples within batches are processed at each training iteration, the initialization of model parameter values, and the selection of neurons to be "dropped out" as part of dropout regularization.

To increase the usefulness of the similarity measures between the corresponding training outputs in the training output pairs 114 for debugging purposes, the system can 100 reduce or eliminate non-determinism between the training operations performed by the first and second computing systems. A few examples follow.

In one example, the system 100 can identify corresponding shared training operations performed by the first and second computing systems that rely on the outputs of random number generators. For each of these training operations, the system can use a single random number generator to generate the required random values for the shared training operation, and thereafter provide the same random values to both the first and second computing systems for use in performing the shared training operation.

In another example, the system 100 can cause the first and second computing systems to process the same batches of training data, and the training examples within each batch of training data in the same order, at each training iteration.

Figure 2:
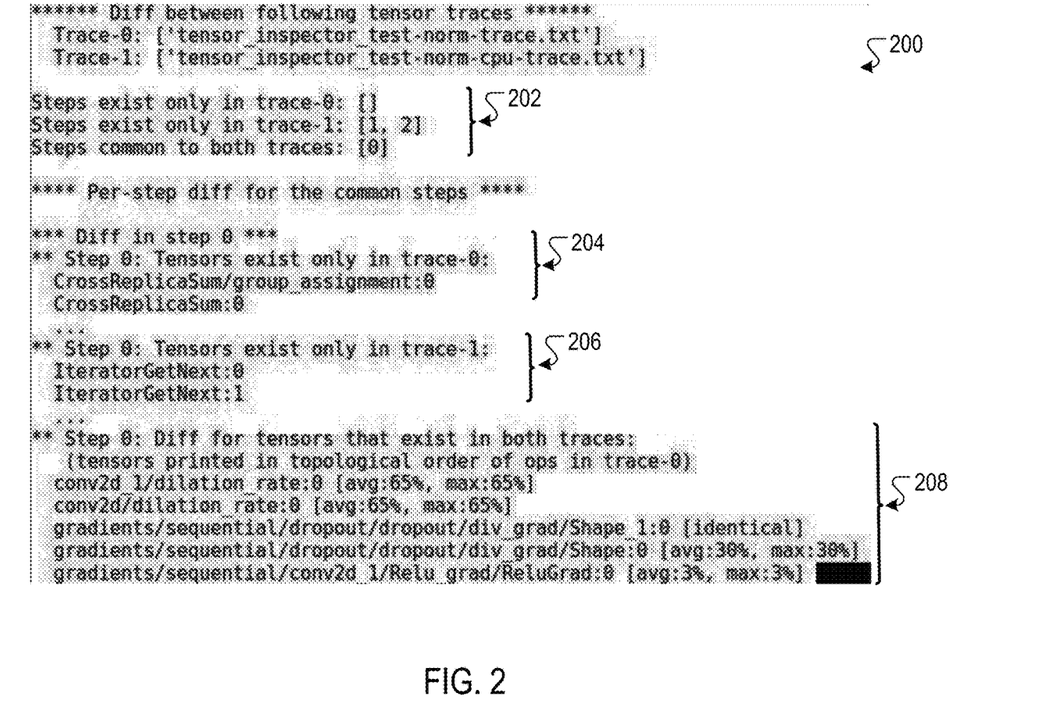
FIG. 2 is an illustration of example textual debugging data that can be generated using the debugging system.
Figure 3:
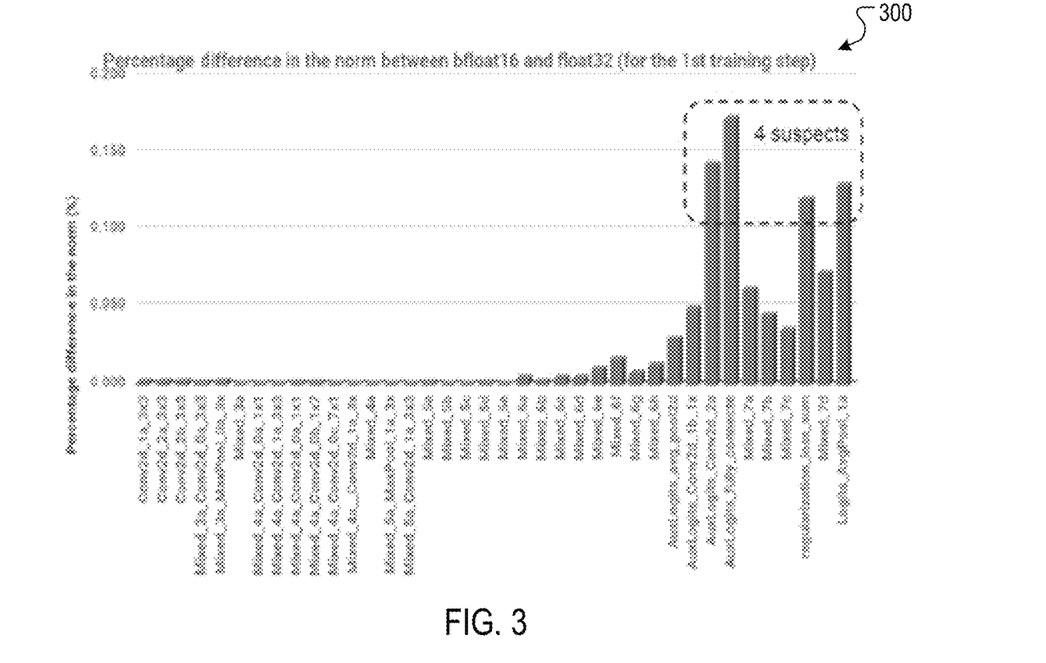
FIG. 3 is an illustration of example graphical debugging data that can be generated using the debugging system.

The system 100 uses the similarity measures determined by the comparison engine 116 for the training output pairs 114 to generate the debugging data 102. The debugging data 102 can represent the similarity measures between the training output pairs 114 in any of a variety of ways, for example, by a textual representation or a graphical representation. FIG. 2 and FIG. 3 illustrate examples of debugging data 102.

The debugging data 102 can provided to a user of the system 100, e.g., through an API made available by the system 100.

A user of the system 100 can use the debugging data 102 to debug any of a variety of correctness issues. In one example, a user may use the debugging system 100 in response to identifying a discrepancy in the accuracy of respective prediction outputs generated by: (i) a first machine learning model trained using a first AI accelerator ASIC that uses 32-bit precision computations, and (ii) a second machine learning model trained using a second AI accelerator ASIC that uses 16-bit precision computations. The user can use the debugging system 100 to generate debugging data 102, and thereafter use the debugging data 102 to identify the particular training operations that cause the discrepancy in prediction accuracy.

Figure 4:
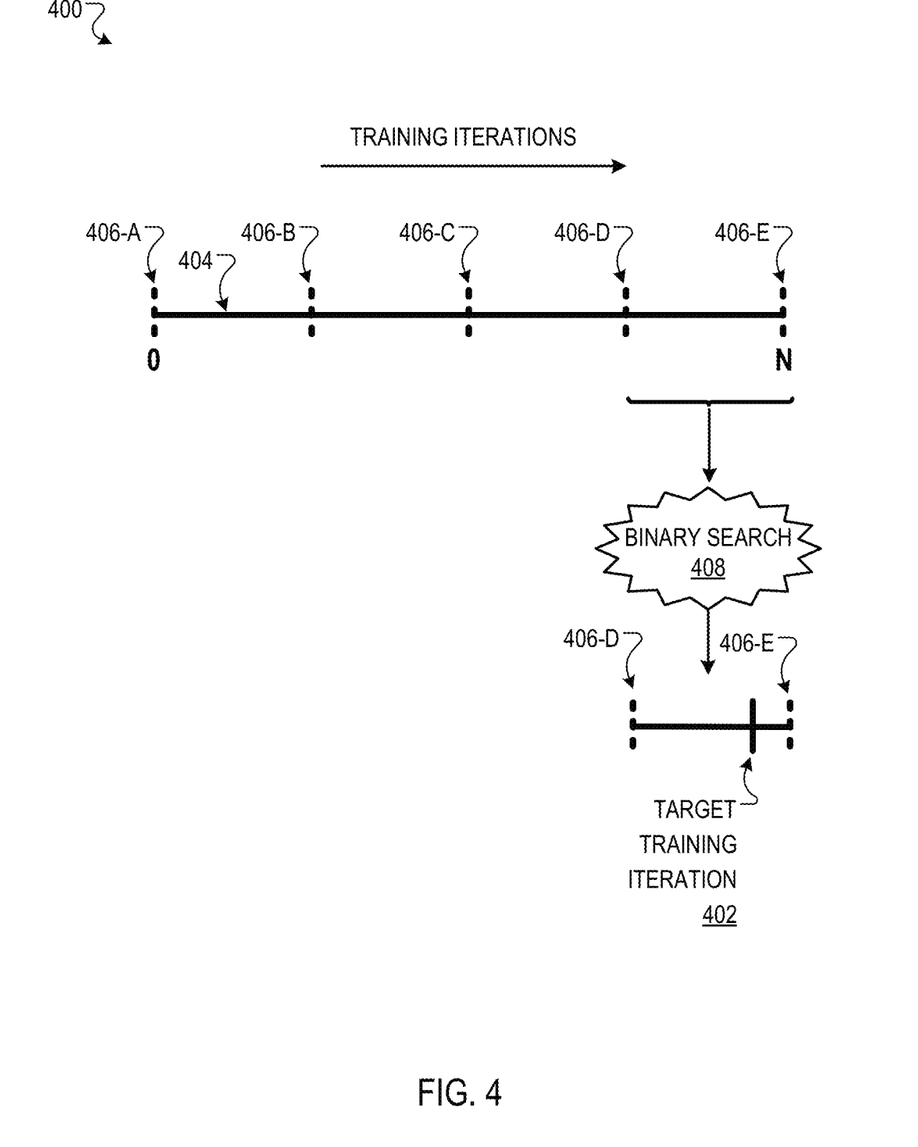
FIG. 4 illustrates an example data flow for identifying the first training iteration where a similarity measure between particular training outputs generated by the first and second computing systems fails to meet a predetermined threshold.

In some cases, rather than generating debugging data 102 for every training iteration, the system 100 can generate targeted debugging data for a particular training iteration; that is, the system 100 can generate debugging data 102 that "zooms in" on a particular training iteration. For example, a user of the system 100 may be particularly interested in the debugging data 102 for the first training iteration where a similarity measure between the objective function gradients generated by the first and second computing systems fail to meet a predetermined threshold. FIG. 4 describes an example process by which the system 100 can use binary search techniques to efficiently identify the first training iteration where a similarity measure between particular training outputs generated by the first and second computing systems fails to meet a predetermined threshold.

FIG. 2 is an illustration of example textual debugging data 200 that can be generated using the debugging system 100 (as described with reference to FIG. 1). The debugging data 200 compares: (i) training outputs generated by a AI accelerator ASIC (in particular, a TPU) computing system over one training iteration (i.e., "trace-0") of training a convolutional neural network model, and (ii) training outputs generated by a CPU computing system over three training iterations of training the same convolutional neural network model (i.e., "trace-1").

The lines 202 of the debugging data 200 indicate that the training iteration "0" has been performed by both computing systems, and training iterations "1" and "2" have been performed only by the CPU computing system.

The remainder of the debugging data 200 compares the training outputs generated by the computing systems for training iteration "0".

The lines 204 of the debugging data 200 indicate that the TPU computing system generated two training outputs (i.e., "CrossReplicaSum/group assignment:0" and "CrossReplicaSum:0") which do not directly correspond to any training outputs generated by the CPU computing system.

The lines 206 of the debugging data 200 indicate that the CPU computing system generated two training outputs (i.e., "IteratorGetNext:0" and "IteratorGetNext:1") which do not directly correspond to any training outputs generated by the TPU computing system.

The lines 208 of the debugging data 200 indicate respective similarity measures between four respective training outputs generated by both the TPU computing system and the CPU computing system. In particular, for the training outputs "conv2d_1/dilation_rate:0" and "conv2d/dilation_rate:0" (which are both matrices of numerical values), the average and maximum difference between their respective matrix norms are 65% and 65% respectively. The average and maximum difference are the same in this case because the output of the matrix norm is a single scalar value. For the training output "gradients/sequential/dropout/dropout/div_grad/Shape_1:0", the TPU computing system and the CPU computing system generate identical values. For the training outputs "gradients/sequential/dropout/dropout/div_grad/Shape:0" (which are both matrices of numerical values), the average and maximum difference between their respective matrix norms are 30% and 30% respectively. For the training outputs "gradients/sequential/conv2d_1/Relu_grad/ReluGrad:0" (which are both matrices of numerical values), the average and maximum difference between their respective matrix norms are 3% and 3% respectively.

The training outputs characterized by the lines 208 of the debugging data 200 are listed in accordance with a topological ordering of the graph of training operations performed by the respective computing systems. Listing the training outputs in accordance with the topological ordering causes the training outputs corresponding to the training operations that caused a "bug" (e.g., correctness issue) to be listed earlier than training outputs that are merely affected by the bug.

FIG. 3 is an illustration of example graphical debugging data 300 that can be generated using the debugging system 100 (as described with reference to FIG. 1). The debugging data 300 compares: (i) training outputs generated by an AI accelerator ASIC (in particular, a TPU) computing system using a 32-bit floating point precision over one training iteration of training a convolutional neural network model, and (ii) training outputs generated by an AI accelerator ASIC (in particular, a TPU) computing system using 16-bit floating point precision over one training iteration of training the same convolutional neural network model (in particular, an "inception_v4" model).

The debugging data 300 is a bar chart that illustrates the percentage difference in the matrix norm of training outputs generated by the two AI accelerator ASIC computing systems with different floating point precisions. The x-axis corresponds to respective training outputs, and the y-axis corresponds to the percentage difference in matrix norm between the training outputs. The training outputs on the x-axis are listed in accordance with a topological ordering of the graph of training operations performed by the respective computing systems. For illustrative purposes, the bar chart is annotated to indicate the particular training outputs with the highest percentage difference in matrix norm. A user of the debugging system may start by examining the training operations that generated these training outputs to determine if they are the cause of any bugs in the training.

FIG. 4 illustrates an example data flow 400 for identifying the first training iteration where a similarity measure between particular training outputs (e.g., objective function gradients or updated model parameter values) generated by the first and second computing systems fails to meet a predetermined threshold.

For convenience, the description of the data flow 400 refers to the first training iteration where the similarity measure between the particular training outputs fails to meet the predetermined threshold as the "target" training iteration 402.

After identifying the target training iteration 402, the debugging system 100 can generate debugging data that "zooms in" on the target training iteration 402, as described with reference to FIG. 1.

To identify the target training iteration 402, the system 100 uses the first and second computing systems to train respective machine learning models while periodically determining a similarity measure between the particular training outputs generated by the first and second computing systems. For example, the system 100 may determine the similarity measure between the particular training outputs every 2000 training iterations. Each time the system 100 determines the similarity measure between the particular training outputs, the system 100 may also "checkpoint" (i.e., store) the current values of the model parameters of the respective machine learning models.

In the data flow 400, the line 404 illustrates the sequence of training iterations performed by the first and second computing systems. The points 406A-E illustrate the training iterations where the system determines the similarity measure between the particular training outputs and checkpoints the current values of the model parameters of the respective machine learning models.

The first time that the system 100 determines that the similarity measure between the particular training outputs fails to meet the predetermined threshold, the system 100 identifies the current training iteration as an upper bound on the target training iteration 402. The system 100 also identifies the most recent previous training iteration where the system 100 determined the similarity measure between the particular training outputs as a lower bound on the target training iteration 402.

In the data flow 400, the point 406-E illustrates the upper bound on the target training iteration 402, and the point 406-D illustrates the lower bound on the target training iteration 402.

After identifying the upper and lower bounds on the target training iteration 402, the system 100 uses an iterative binary search technique 408 to identify the target training iteration 402.

At each iteration of the binary search, the system 100 updates either the current upper or the current lower bound on the target training iteration 402.

To update the current bounds on the target training iteration 402, the system 100 loads the stored values of the model parameters of the respective machine learning models being trained by the first and second computing systems. The system 100 then resumes training using the first and second computing systems until the training iteration that is midway between the current bounds on the target training iteration 402 (i.e., the "midpoint" iteration).

After reaching the midpoint iteration, the system 100 determines the similarity measure between the particular training outputs at the midpoint iteration. If the similarity measure satisfies the predetermined threshold, the system 100 identifies the midpoint iteration as the new lower bound on the target training iteration 402. If the similarity measure does not satisfy the predetermined threshold, the system 100 identifies the midpoint iteration as the new upper bound on the target training iteration 402.

After updating the current bounds on the target training iteration 402, the system 100 checkpoints the current values of the model parameters of the respective machine learning models at the midpoint iteration, and proceeds to the next iteration of the binary search.

The binary search can terminate when the lower and upper bounds on the target training iteration 402 are adjacent to one another, at which point the system 100 can identify the target training iteration 402 as the current upper bound.

Figure 5:
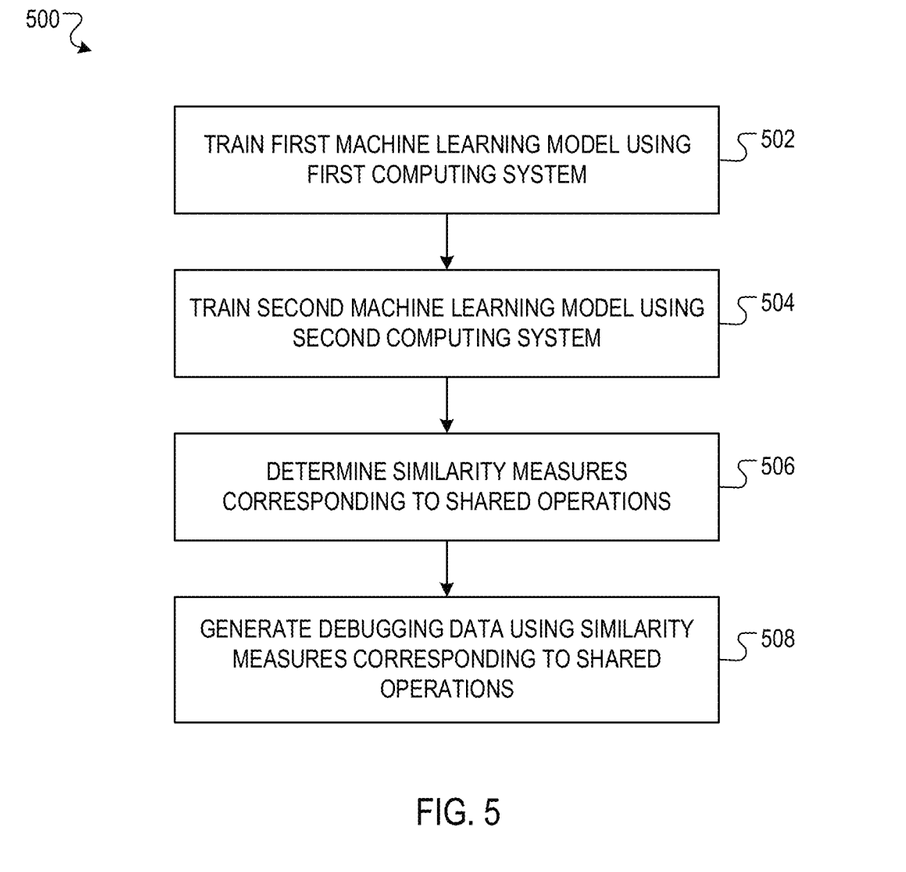
FIG. 5 is a flow diagram of an example process for generating debugging data.

FIG. 5 is a flow diagram of an example process 500 for generating debugging data. For convenience, the process 500 will be described as being performed by a system of one or more computers located in one or more locations. For example, a debugging system, e.g., the debugging system 100 of FIG. 1, appropriately programmed in accordance with this specification, can perform the process 500.

The system trains a first machine learning model using a first computing system (502). The architecture of the first machine learning model may be defined by data provided by a user of the system, e.g., through an API made available by the system.

The system trains a second machine learning model having the same architecture as the first machine learning model using a second computing system (504). The second computing system has a different configuration than the first computing system. For example, the hardware of the second computing system may be implemented by one or more AI accelerator ASICs, while the hardware of the first computing system may be implemented by one or more CPUs.

The system may reduce or eliminate any non-determinism between the training operations performed by the first and second computing systems. For example, the system may provide the same random values to both the first and second computing systems for use in performing shared training operations that require random values. As another example, the system may cause the first and second computing systems to process the same batches of training data, and the training examples within each batch of training data in the same order, at each training iteration.

The system determines a respective similarity measure corresponding to each of multiple shared training operations that are performed by both the first computing system and the second computing system (506). The similarity measure corresponding to a shared training operation measures a similarity between: (i) a first training output generated by the first computing system by performing the shared training operation, and (ii) a second training output generated by the second computing system by performing the shared training operation.

The system provides the similarity measures corresponding to the shared training operations for use in debugging the training of the machine learning model on one or both of the computing systems (508). For example, the system may generate and provide a graphical or textual representation of the similarity measures corresponding to the shared training operations to a user of the system, e.g., through an API made available by the system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    training a first machine learning model having a machine learning model architecture using a first computing system having a first configuration;
    training a second machine learning model having the machine learning model architecture using a second computing system having a second configuration, wherein the second configuration of the second computing system is different than the first configuration of the first computing system;
    determining, for each of a plurality of shared training operations that are performed by both the first computing system and the second computing system, a respective similarity measure that measures a similarity between:
        a first training output generated by the first computing system by performing the shared training operation during the training of the first machine learning model, the first training output comprising a first matrix, and
        a second training output generated by the second computing system by performing the shared training operation during the training of the second machine learning model, the second training output comprising a second matrix; and
    providing the respective similarity measure determined for each of the plurality of shared training operations for use in comparing: (i) the training of the first machine learning model performed by the first computing system having the first configuration, and (ii) the training of the second machine learning model performed by the second computing system having the second configuration,
    wherein determining the respective similarity measure comprises:
        determining a first signature that represents the first matrix, the first signature having a lower dimensionality than the first matrix;
        determining a second signature that represents the second matrix, the second signature having a lower dimensionality than the second matrix; and
        determining that the first signature and the second signature are different.

2. The method of claim 1, wherein:
    the first training outputs generated by the first computing system are generated using one or more application-specific integrated circuits; and
    the second training outputs generated by the second computing system are generated using one or more central processing units.

3. The method of claim 2, wherein the application-specific integrated circuits are artificial intelligence accelerators.

4. The method of claim 3, wherein one or more of the artificial intelligence accelerator application-specific integrated circuits are tensor processing units.

5. The method of claim 1, wherein:
    the first training outputs generated by the first computing system are generated using one or more first application-specific integrated circuits having an X-bit architecture; and
    the second training outputs generated by the second computing system are generated using one or more second application-specific integrated circuits having a Y-bit architecture, wherein X and Y are different positive integer values.

6. The method of claim 1, wherein one or more correctness issues occur during the training of the first machine learning model, and no correctness issues occur during the training of the second machine learning model.

7. The method of claim 6, wherein:
    parameter values of the first machine learning model do not converge during the training using the first computing system; and
    parameter values of the second machine learning model converge during the training using the second computing system.

8. The method of claim 6, wherein:
    one or more special values are generated during the training using the first computing system; and
    no special values are generated during the training using the second computing system.

9. The method of claim 8, wherein the special values are not-a-number values.

10. The method of claim 1, wherein the machine learning model architecture is a neural network architecture.

11. The method of claim 10, wherein the plurality of shared training operations comprise one or more of: determining a value of an objective function, determining a gradient of the objective function, determining an output of a neural network layer, determining a result of a convolution operation of a neural network layer, determining a result of an activation function of a neural network layer.

12. The method of claim 1, wherein a signature representing a tensor comprises one or more of: data indicating whether any elements of the tensor have special values, a matrix norm of the tensor, or a proper subset of the tensor.

13. The method of claim 1, wherein:
training the first machine learning model comprises:
using a random number generator to generate a plurality of random values; and
using the random values during the training of the first machine learning model; and
training the second machine learning model comprises:
obtaining the plurality of random values used during the training of the first machine learning model; and
using the plurality of random values during the training of the second machine learning model.

14. The method of claim 1, wherein:
the plurality of shared training operations each occur during a particular training iteration; and
the particular training iteration is identified by performing a binary search for a first training iteration where a particular similarity measure between a particular first training output generated at the particular training iteration and a particular second training output generated at the particular training iteration does not meet a predetermined threshold.

15. The method of claim 1, wherein providing the respective similarity measure determined for each of the plurality of shared training operations comprises:
generating a graphical representation of the respective similarity measures that presents the respective similarity measures in accordance with a topological ordering of a graph of training operations performed by the first and second computing systems; and
storing the graphical representation or presenting it to a user.

16. One or more non-transitory computer storage media storing instructions that when executed by one or more computers cause the one or more computers to perform operations comprising:
training a first machine learning model having a machine learning model architecture using a first computing system having a first configuration;
training a second machine learning model having the machine learning model architecture using a second computing system having a second configuration, wherein the second configuration of the second computing system is different than the first configuration of the first computing system;
determining, for each of a plurality of shared training operations that are performed by both the first computing system and the second computing system, a respective similarity measure that measures a similarity between:
a first training output generated by the first computing system by performing the shared training operation during the training of the first machine learning model, the first training output comprising a first matrix, and
a second training output generated by the second computing system by performing the shared training operation during the training of the second machine learning model, the second training output comprising a second matrix; and
providing the respective similarity measure determined for each of the plurality of shared training operations for use in comparing: (i) the training of the first machine learning model performed by the first computing system having the first configuration, and (ii) the training of the second machine learning model performed by the second computing system having the second configuration,
wherein determining the respective similarity measure comprises:
determining a first signature that represents the first matrix, the first signature having a lower dimensionality than the first matrix;
determining a second signature that represents the second matrix, the second signature having a lower dimensionality than the second matrix; and
determining that the first signature and the second signature are different.

17. A system comprising:
one or more computers; and
one or more storage devices communicatively coupled to the one or more computers, wherein the one or more storage devices store instructions that, when executed by the one or more computers, cause the one or more computers to perform operations comprising:
training a first machine learning model having a machine learning model architecture using a first computing system having a first configuration;
training a second machine learning model having the machine learning model architecture using a second computing system having a second configuration, wherein the second configuration of the second computing system is different than the first configuration of the first computing system;
determining, for each of a plurality of shared training operations that are performed by both the first computing system and the second computing system, a respective similarity measure that measures a similarity between:
a first training output generated by the first computing system by performing the shared training operation during the training of the first machine learning model, the first training output comprising a first matrix, and
a second training output generated by the second computing system by performing the shared training operation during the training of the second machine learning model, the second training output comprising a second matrix; and
providing the respective similarity measure determined for each of the plurality of shared training operations for use in comparing: (i) the training of the first machine learning model performed by the first computing system having the first configuration, and (ii) the training of the second machine learning model performed by the second computing system having the second configuration,
wherein determining the respective similarity measure comprises:
determining a first signature that represents the first matrix, the first signature having a lower dimensionality than the first matrix;

determining a second signature that represents the second matrix, the second signature having a lower dimensionality than the second matrix; and determining that the first signature and the second signature are different.

18. The system of claim 17, wherein:

the first training outputs generated by the first computing system are generated using one or more application-specific integrated circuits; and the second training outputs generated by the second computing system are generated using one or more central processing units.

\* \* \* \* \*